United States Patent [19]

Atwood et al.

[11] 4,233,187

[45] Nov. 11, 1980

[54] CATALYST AND PROCESS FOR STEAM-REFORMING OF HYDROCARBONS

[75] Inventors: Kenton Atwood, New Albany, Ind.; James H. Wright, Louisville; Jay S. Merriam, La Grange, both of Ky.

[73] Assignee: United Catalysts Inc., Louisville, Ky.

[21] Appl. No.: 24,005

[22] Filed: Mar. 26, 1979

Related U.S. Application Data

[63] Continuation-in-part of Ser. No. 817,160, Jul. 20, 1977, abandoned, and a continuation-in-part of Ser. No. 708,941, Jul. 27, 1976, abandoned.

[51] Int. Cl.$^3$ .................... B01J 21/04; B01J 23/74; B01J 35/02
[52] U.S. Cl. ...................... 252/466 J; 252/373; 252/477 R; 423/653
[58] Field of Search ................ 252/373, 466 J, 477 R

[56] References Cited

U.S. PATENT DOCUMENTS

| | | | |
|---|---|---|---|
| 3,119,667 | 1/1964 | McMahon | 252/373 X |
| 3,201,214 | 8/1965 | Fox et al. | 48/214 A |
| 3,359,215 | 12/1967 | Reitmeier | 252/477 R |
| 3,502,596 | 3/1970 | Sowards | 252/477 R |
| 3,518,055 | 6/1970 | Egashira et al. | 252/373 X |

FOREIGN PATENT DOCUMENTS 7532280  10/1975  Belgium .................................. 252/373

*Primary Examiner*—W. J. Shine
*Attorney, Agent, or Firm*—William R. Price

[57] ABSTRACT

An improved catalyst and an improved process for use of the catalyst in the steam-hydrocarbon reforming reaction is disclosed. The catalyst comprises a group VIII metal on a cylindrical ceramic support consisting essentially of alpha alumina and having a plurality of gas passages extending axially therethrough. These supported catalysts display a higher geometric surface area and a lower pressure drop than do standard rings.

2 Claims, 8 Drawing Figures

CATALYST AND PROCESS FOR STEAM-REFORMING OF HYDROCARBONS

CROSS-REFERENCE TO RELATED APPLICATION

This application is a continuation-in-part of our copending application entitled Steam-Hydrocarbon Reforming Process, Ser. No. 708,941 and filed July 27, 1976, now abandoned, and of our copending application Ser. No. 817,160 filed July 20, 1977, now abandoned.

FIELD OF THE INVENTION

This invention relates to a method of producing hydrogen from mixtures of steam and hydrocarbons with the aid of a catalyst. More specifically, this invention relates to the production of hydrogen and carbon monoxide through the steam-hydrocarbon reaction with the use of a catalyst comprising a catalytic amount of an iron group metal deposited on a refractory support consisting essentially of alpha alumina having two or more gas passages axially disposed therein and running from end to end. The supports display a higher superficial geometric surface area and a lower pressure factor than do standard rings. These supports, in a preferred embodiment of this invention are in the form of spoked wheels and are fabricated primarily of a crystalline alumina in the alpha phase. Nevertheless, supports of other geometric configurations, but containing two or more axially disposed gas passages, are embodied within the scope of this invention.

BACKGROUND OF THE INVENTION

Catalytic reactions between hydrocarbons and steam are strongly endothermic. Several types of reforming processes have been developed through the years, each having unique features. The tubular reformer has eventually become preferred as tube metallurgy has progressed. Tubular reformers, which are directly fired have evolved with operating pressures ranging from atmospheric to 600 PSIG or more and the tube metal temperatures of up to 1800° F. or higher. In the early years of steam-hydrocarbon reforming, many users equated performance with the life of the catalyst as manifested by catalyst strength. This was due to the fact that the vast majority of reforming furnaces were designed so conservatively that virtually any reforming catalyst would demonstrate satisfactory performance so long as the catalyst remained physically intact. However, some of the more modern high-severity reformers are much less conservative in design. As a result localized catalyst activity becomes the limiting feature of the catalyst as high activity must be maintained to maintain tube temperatures within allowable limits.

New catalyst in a commercial reformer reaches lined out performance immediately after startup regardless of the catalyst type used. Within a rather wide range initial activity can be affected by specific nickel surface area, nickel form and particle size. Lined out catalyst activity is not appreciably affected by nickel concentrations above approximately 30 percent, or nickel crystaline sizes below about 200 Å or overall catalyst surface area. The effective nickel concentration or metallic concentration in the range of from 6 to 30 percent is about the effective range above which additional catalytic metal on the carrier does not produce any appreciable result.

Catalyst particle size or geometric surface area does have a marked influence on activity exhibited under all operating conditions. One reason attributed to the increase in activity is attributed to the improved heat transfer characteristics obtained as well as the increased superficial or geometric catalytic surface exposed which significantly increases gas diffusion rates to catalytic sites. The improvement which can be obtained in activity by going to smaller catalyst sizes is significant. This approach has been very successful in overcoming localized activity problems encountered in operating units. It has been widely accepted therefore, all other factors being equal, that the catalytic efficiency of a particular catalyst for the steam-hydrocarbon reforming reaction, is directly proportional to the geometric surface area of the catalyst pellet. It would be expected that a catalyst pellet containing a plurality of axially disposed gas passages and having a large superficial geometric surface area because of the interior walls of the gas passages would exhibit proportionally higher catalyst efficiency for the steam-hydrocarbon reaction. Applicants found however that the expected increases in catalytic efficiency did not occur with catalyst tablets containing a plurality of gas passages. Applicants therefore concluded that the catalytic efficiency provided by the geometric surface area of the exterior surface of the catalyst tablet was not achieved with the geometric surface area of the interior walls of the gas passage of said catalyst tablet.

SUMMARY OF THE INVENTION

According to this invention, catalytic activity is a function of the geometric surface area of the exterior surface of the tablet and of the available geometric surface area provided by the interior walls of gas passages extending through the catalyst pellet. However, while catalytic efficiency provided by the geometric surface area of the interior walls of the axially disposed gas passages, is directly proportional to the effective diameter of each of the gas passages catalytic efficiency provided by the geometric surface area of the interior surfaces of the walls of said gas passages is inversely proportional to the length or height of the tablet. We have found therefore that there is a definite relationship of the hole or gas passage width, relative to the height or length of the catalyst tablet. The ratio of the height:effective internal diameter (H:ID) appears to place a definite limitation on catalyst activity. We have found further that a preferred catalyst comprises a group VIII metal on a support having two or more gas passages extending axially therethrough. Further we have found that the support itself should consist of essentially alumina in the alpha phase. Therefore, this invention requires a cylindrical refractory support having two or more gas passages extending axially therethrough and having a catalytically active amount of cobalt or nickel oxide deposited thereon. Specifically we have found that the catalyst should have a Relative Activity Coefficient Factor ($ACF^R$), (as defined hereinafter) and a Relative Pressure Factor ($PF^R$) (as defined hereinafter), in excess of that of a standard ring, and the $ACF^R$ should be in the excess of 1 and the ratio of the $ACF^R$ to $PF^R$ should be in excess of 1. Further we, have found that the height (H) of the catalyst support should bear a relationship to the effective internal diameter (ID) of each of said gas passages of said support. Therefore, the ratio of H:ID of said catalyst support should be less than 4:1.

BRIEF DESCRIPTION OF THE DRAWINGS

Referring now to the drawings.

DESCRIPTION OF THE PREFERRED EMBODIMENT

Figure 1:
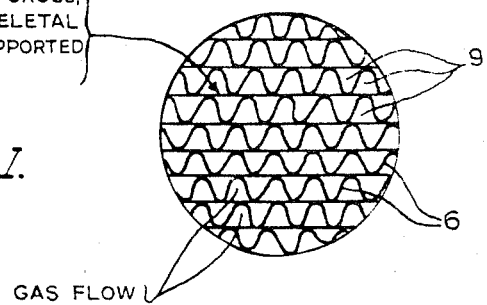
FIG. 1 is an end view of the catalyst of this invention, illustrating the structure of the catalyst and the multiplicity of gas passages or channels.
Figure 2:
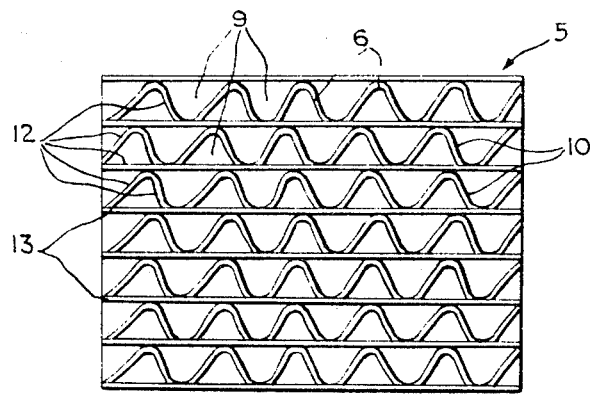
FIG. 2 is a fragmentary and enlarged view showing in detail the structure of the ceramic support.
Figure 3:
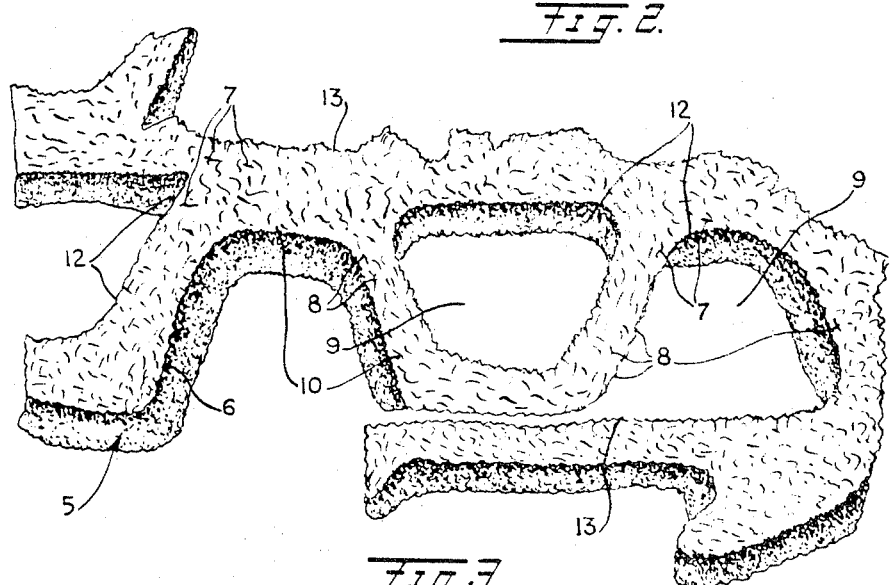
FIG. 3 is an enlarged fragmentary view partly in perspective illustrating the structure and texture of the finished catalyst material.

Referring now to FIGS. 2 and 3, support for catalyst 5 comprises a unitary porous refractory structure 6 of aluminum oxide in its alpha phase. The structure 6 has, as shown in FIG. 3, pores 7 in the interior portion and also superficial macropores 8 communicating with the gas flow channels or passages 9 which extend axially through the structure 6. The channels 9 as shown are of generally trapezoidal shape in cross-section and are defined by the corrugations 10 and generally horizontal layers 13 of the ceramic support. The catalytic constituent 12 of the iron group and specifically cobalt or nickel is deposited directly by dipping of the unitary refractory skeletal structure 6 into a solution of the metal salts to produce the supported catalyst of FIGS. 2 and 3. In the supported catalyst of FIG. 3, the catalytic material 12 is deposited on the surface of gas flow channels 9 and also on the surfaces of superficial macropores which communicates with channels 9. The macropores 8 of the ceramic structure are predominantly sized in diameter in excess of 350 Å. While the channels 9 have been shown to be of a trapezoidal shape, they can also be rectangular, square, sinusoidal or circular so that cross-sections of the support represent a repeating pattern that can be described as a honeycomb, corrugated or lattice structure. Such skeletal supports are produced commercially by the American Lava Company under the name of Alsimag or I. E. Dupont and Company under the name of Torvex. Additionally, the supports are produced by foreign manufacturers such as Kyocela of Japan. The catalytic metals which have been described for this reaction as is known consists of nickel, cobalt or iron alone or activated by addition of other metals or metallic compounds known as difficulty reducible metal oxides. For example, chromium, vanadium, or compounds of each and of the alkaline earth metals, such as potassium or aluminum may be employed as activators. Nickel and cobalt however, are the most widely used metallic constituents for such catalysts. For this reason, all of the examples have been described as employing nickel as the catalytic constituent.

The prior art has accepted the proposition that catalytic activity in the steam hydrocarbon reforming reaction is a function of the geometric surface area of the catalyst. As previously indicated, this is partially attributed to the heat transfer of the highly endothermic reaction which is a function of the geometric surface area and of the fraction voids of the catalyst particle.

However, the art has not recognized that geometric surface area provided by the interior walls of catalysts having multiple gas passages (multihole catalysts) does not act as a function of catalytic activity. Our researches have shown, therefore, that it is necessary to take these factors into consideration. We have found that only the effective surface area provided by the interior gas passage walls contribute to catalytic activity. We find, therefore, that with multiholed catalysts, in endothermic reactions, that:

(1) the geometric area of the exterior surface is directly proportional to catalytic activity.

(2) that the effective diameter or width of the gas passage opening is directly proportional to catalyst activity; and, (3) that catalyst efficiency is inversely proportional to the height of the catalyst pellet.

The effective surface area of the interior gas channel walls of multihole catalysts bears a relationship of tablet height or length to gas passage width or diameter (H:ID). The effective diameter is defined as the width of the opening of the gas passageway, when the area of said opening is expressed as circle. This expression is necessitated since the gas passage openings may be circular, square, rectangular, trapezoidal, triangular, sinusoidal, etc. The exact configuration of the gas passage is immaterial. What does matter is the relationship of the height of the catalyst pellet to the effective internal diameter of the gas passage. In making these determinations, the following constants, utilized in the equations were derived from the following references.

Campbell, John M., and Huntington, R. L., "Heat Transfer and Pressure Drop in Fixed Beds of Spiral and Cylindrical Solids," *Petroleum Refiner*, Vol. 30, Number 12 (1951) pp. 127–133.

Leva, Max, "Pressure Drop Through Packed Tubes, Part I, A General Correlation" *Chemical Engineering Progress*, Vol. 43 (1947) pp. 549–54.

Leva, Max and Grummer, Milton, IBID. (1947) 633–648.

Leva, Max, Ibid, pp. 713–718.

The values of these constants are:

$a = 0.373$
$b = 1.848$
$c = 0.1393$

Let:

$FH$ = Fraction of particle taken up by hole(s)
$FHS = FH$
$DT$ = Tube I.D. in which the particles are to be packed
$A'$ = Area of particles with no hole(s)
$V'$ = Volume of particles with no hole(s)
$F'$ = Fraction voids of particle with no hole(s)

$$a + b \frac{V}{A'DT} = .373 + \frac{1.848V}{A'DT}$$

A = Area of particles with hole(s)
V = Volume of particle with hole(s)
F = Actual fraction voids $$F = a + (1-a)FH + (1-FH)\frac{bV}{A'DT} =$$
$$.373 + .627 FH + (1-FH)\frac{1.848V}{A'DT}$$

ACTIVITY COEFFICIENT FACTOR = ACF $$ACF = \frac{\text{Area}}{\text{ft}^3} = (1 - a - \frac{bV}{DTA'})\frac{A}{V} =$$
$$(.627 - \frac{1.848V}{DTA'})\frac{A}{V}$$

PRESSURE FACTOR = PF $$PF = c(A/V)^{1.1}\frac{(1-F)}{F^3} = .1393(A/V)^{1.1}\frac{(1-F)}{F^3}$$

The Relative Activity Coefficient Factor is obtained by dividing the value of the ACF for the standard by the ACF value of the sample. Thus, $ACF^R$ for the standard becomes one, whereas catalysts having an ACF greater than the standard have a value in excess of one. The ability of the catalyst to promote heat transfer into the reacting gas is essentially proportional to the activity factor. The Relative Activity Coefficient Factor ($ACF^R$), and the Relative Pressure Factor ($PF^R$) for each of the carriers illustrated in FIGS. 4, 5, 6, and 7 are as follows:

TABLE I

| | | | (Based on a 2.9 inch ID tube) | | | | |
|---|---|---|---|---|---|---|---|
| | $ACF^R$ | $PF^R$ | RATIO $\frac{ACF^R}{PF^R}$ | Diameter (in.) | Height (in.) | ID (in.) | Equiv. No. of Holes | Corrgations (No. of) |
| Standard | 1 | 1 | 1 | .625 | .375 | .25 | 1 | 0 |
| Honeycomb FIG. 4 | 2.48 | .47 | 5.28 | .785 | .797 | .076 | 46 | 0 |
| Honeycomb FIG. 5 | 2.06 | .39 | 5.62 | .625 | .250 | .135 | 11 | 0 |
| Modified Ring FIG. 6 | 1.23 | .68 | 1.81 | .625 | .250 | .375 (Average) | 1 | 0 |
| Modified Ring FIG. 7 | 1.28 | .85 | 1.50 | .625 | .250 | .25 | 1 | 4 |

Figure 4:
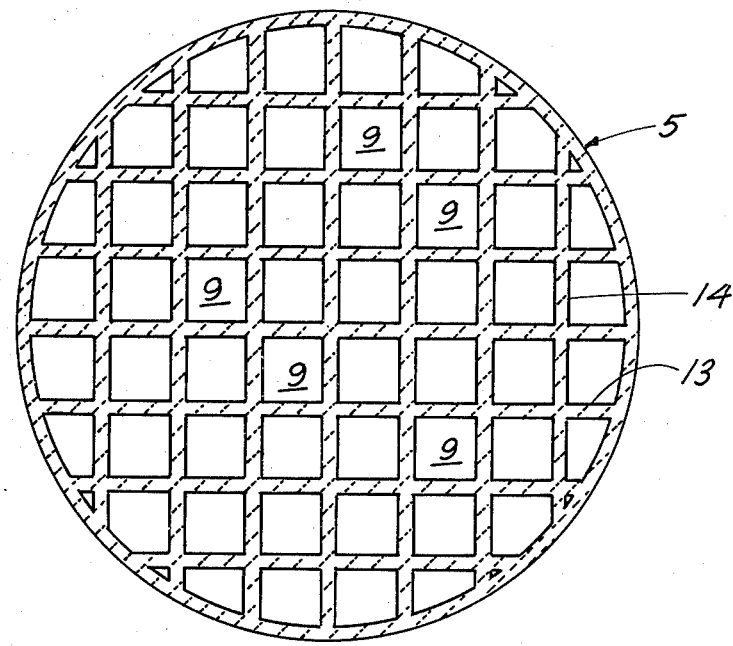
FIG. 4 is an end view of the honeycomb catalyst having square channels drawn to a 5.3 to 1 scale and which is identical to the catalyst used in the examples of this invention.
Figure 5:
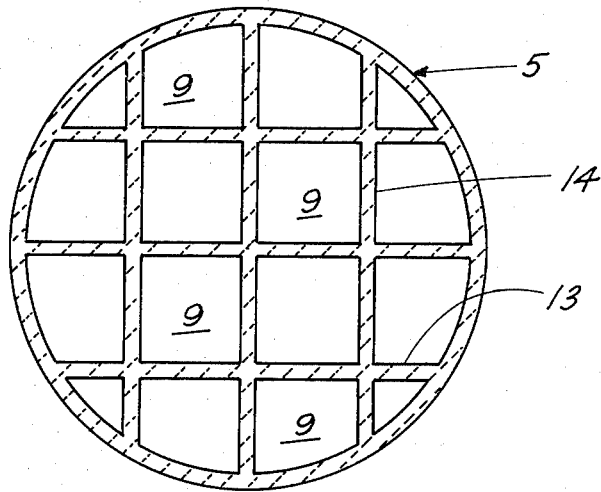
FIG. 5 is a modified honeycomb structure drawn to a 5.1 to 1 scale with larger square shaped channels and thicker horizontal and vertical walls.
Figure 6:
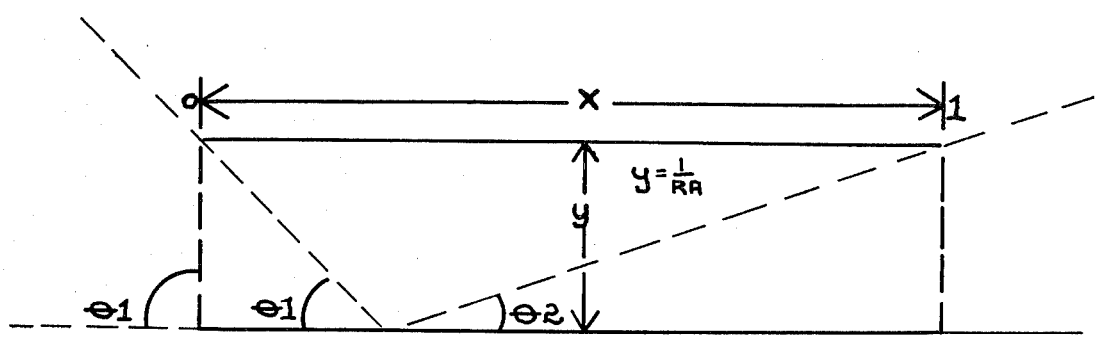
FIG. 6 is a diagrammatic representation of light rays striking the interior walls of a gas passageway.

It should be noted that the honeycomb of FIG. 4 produced the largest relative $ACF^R$ and the largest value of the ratio of $ACF^R$:$PF^R$.

The conditions for the hydrocarbon reforming reaction are well known and vary basically from an inlet temperature of from 800° F. to 1500° F. and at pressures of from 0 to 600 PSIG. As the pressure is increased, the severity of the conditions increase. Further, as the temperature increases, the severity of conditions to which the catalyst is subjected in increased.

It is standard practice, in the field, to increase the skin temperature of the catalytic reactor tubes to maintain a given production. Therefore, the skin temperature of the tube at a particular localized point in the reactor can become critical. Consequently, the lower the temperature that can be maintained at a specific catalytic activity, the lower the fuel consumption in the reformer and the less stress placed on the catalytic reformer tubes. The steam-carbon ratio varies any place from 1.5:1 to 8:1. It is well known, of course, that as the length of the hydrocarbon chain is increased, the steam to carbon ratio must be increased to prevent and minimize carbon laydown. Nevertheless, the lower the steam to carbon ratio, that can be maintained, the lower the steam requirement and the lower the fuel requirement for the process.

EXAMPLE

With a view to these factors, all of the catalysts of this invention have been prepared in an identical manner. This is by multiple dips or immersions into a nickel nitrate solution followed by sequential calcinations at temperatures of from 900° to 1000° F. for a period sufficiently long to convert the nickel nitrate over to nickel oxide. Sufficient dips were made with each of the carriers so that the final nickel concentration expressed as the metal was 12 percent.

The typical ceramic carrier is a ring fabricated of aluminum oxide in its alpha phase having a ⅝-inch diameter, a height of ½-inch and having a ⅜-inch hole in the center. For purposes of comparison, this catalyst has been utilized as a standard.

Each of the other catalysts were prepared by multiple dips of the carrier into the nickel nitrate solution in identical manner and identical calcination temperatures. The only difference was in the size of the carriers and in the composition thereof. The cordierite carrier widely used in catalytic mufflers is a magnesium alumina silicate having the formula $Mg_2Al_4Si_5O_{18}$. Table II indicates the physical properties of the catalytic carriers tested.

TABLE II

| PHYSICAL PROPERTIES OF HONEYCOMB CARRIERS | | | |
|---|---|---|---|
| Sample | Catalyst 1 Honeycomb Cordierite Composition $Mg_2Al_4Si_5O_{18}$ | Catalyst 2 Honeycomb Corundum Composition $Al_2O_3$ | Catalyst 3 Honeycomb Corundum $Al_2O_3$ Quantity |
| | | FIG. 4 | |
| Diameter (in) | 0.799 | 0.785 | 0.8055 |
| No. Full Size Hole Equivalent | 46 | 46 | 46 |
| Size of Holes (in) | .078 Square | .076 Square | .078 Square |
| Length (in) | 0.797 | 0.797 | 0.2598 |

TABLE II-continued
PHYSICAL PROPERTIES OF HONEYCOMB CARRIERS

| Sample | Catalyst 1 Honeycomb Cordierite Composition $Mg_2Al_4Si_5O_{18}$ | Catalyst 2 Honeycomb Corundum Composition $Al_2O_3$ | Catalyst 3 Honeycomb Corundum $Al_2O_3$ Quantity |
|---|---|---|---|
| Weight (g/piece) | 4.51 | 5.74 | 1.932 |
| $ccH_2O$ absorbed/piece | 1.32 | 1.25 | 0.80 |
| $ccH_2O$ absorbed/100 g. | | | 41.30 |
| $ccH_2O$ displaced/piece | 3.10 | 2.60 | |
| $ccH_2O$ displaced/100 g. | | | |
| Apparent Volume(cc/piece) | 6.55 | 6.32 | 2.17 |
| Apparent Density (g/cc) | 0.69 | 0.91 | 0.891 |
| Calc. Drum Density(lbs/ft$^3$) | 27 | 35.6 | 31.8 |
| Calc. Catalyst(20% Ni) Drum Density(lbs/ft$^3$) | 34 | 45 | |
| Solid Density(g/cc) | 1.27 | 2.21 | |
| % Voids | 52 | 58 | |
| Crush(Vert. to Ribs) (lbs.) | 183(210/160) | 80(100/61) | 34.9(52/22) |
| Crush(45° to Ribs) (lbs.) | 86(100/75) | 26(32/21) | 15.7(19/13) |
| Chemicals (XRF) | Major Si Minor Al <0.01% Zn ≈0.005% Fe | Major Al <01% Zn ≈0.005% Fe <0.05% $SiO_2$ | 0.10% $SiO_2$ |
| XRD | $Mg_2Al_4Si_5O_{18}$ (400Å) | $Al_2O_3$(400Å) | $Al_2O_3$(250Å) |
| 350 | | | 350 Å-0.218 |
| Hg. Pore Vol. (cc/g 29.2Å) | 0.443 | | |
| Surface Area (m$^2$/g) | 0.27 | 1.39 | 2.3 |
| (cc/g 350Å) | .369 | .187 | .218 |

Table III indicates the activity thereof at temperatures ranging from 1400° F. to 1600° F. The conditions of the test were identical in each situation so as to offer a fair comparison of activity. Thus, the feed composition was natural gas or methane with a steam to gas ratio of 3.0:1. The gas was fed through a reactor at temperatures of from 1400° F. to 1600° F. after reduction and at atmospheric pressure with a theoretical hydrocarbon space velocity of 2000. Theoretical hydrogen space velocity is defined as volume of theoretical $H_2$ produced per volume of catalyst per hour calculated by assuming complete reforming of all hydrocarbons.

TABLE III

| Carrier Size (Inches) Nickel Content H:ID | Catalyst 1 Cordierite Honeycomb .799 × .797 12% Ni | Catalyst 2 Corundum Honeycomb .785 × .797 12% Ni 9.3:1 | Catalyst 3 Corundum Honeycomb .8055 × .2598 12% Ni 2.95:1 | Catalyst 4 Corundum Ring ⅝"×⅜"×¼" 12% Ni |
|---|---|---|---|---|
| $CH_4$ Leakage* | | | | |
| 1400° | 2.74 | 0.74 | 0.245 | .75 |
| 1600° | 0.49 | 0.19 | 0.017 | .2 |
| $ACF^R$ | 2.40 | 2.48 | 2.73 | 1.00 |
| $ACF^R/PF^R$ | 5.22 | 5.28 | 4.88 | 1.00 |
| FIG. 4 Standard Catalysts | | | | |

Catalyst 2, (illustrated in FIG. 4) having the honeycomb structure and the alpha alumina composition, demonstrated more activity than did Catalyst 1 at 1400° F. Catalyst 2 had a methane leakage* of 0.74% (an indication of activity) as compared to 2.74% for Catalyst 1. Thus, the leakage for Catalyst 2 was less than a third of that for Catalyst 1 even though the geometric structure of the catalysts was essentially the same. The difference in the activity of the two catalysts, i.e., 1 and 2, can be attributed only to the difference in composition of the carrier. Such a discrepancy in the activity of the catalyst attributable to the composition of the carrier having essentially the same geometric area and the same geometric configuration is clearly unexpected.

*"methane leakage" is a term of convenience. The lower the leakage the more complete is the reaction. Thus a low methane leakage is an indication of high activity.

Catalyst 3, on the other hand, demonstrated superior activity to Catalyst 4 (the standard ring). Note for example, that at 1400° F. the methane leakage for Catalyst 3 was 0.245% while the leakage for both Catalysts 2 and 4 was about 0.75%. Thus, the methane leakage for Catalyst 3 was about a third of that for Catalysts 2 and 4. Catalyst 3, having essentially the same chemical composition as Catalyst 2, and having the same nickel concentration; differed only from Catalyst 2 in relation to the Height (h) or Length of the catalyst particle. We have established a ratio of Height:ID (effective internal diameter of the hole or gas channel) as being less than 4:1. The H:ID of Catalyst 2 (0.797:0.076) was about 9.3:1. The H:ID ratio of Catalyst 3 (0.2598:0.078) was 2.95:1 or less than 4:1. The increase in activity of Catalyst 3 over Catalyst 2, having essentially the same geometric configuration, the same concentration of catalytic metal, the same carrier composition, the same Activity Factor, the same Pressure Factor and the same Ratio of Activity Factor to Pressure Factor, can be attributed then only to the difference in ratio of the height of the catalyst particle to the effective diameter of the hole or gas channel. This ratio appears to place a limitation on the Activity Factor and the Pressure Factor, previously discussed, since, based upon these factors, Catalyst 2 should have had a markedly superior activity to the activity of the standard ring. In reality, however, the two activities were almost identical. It was concluded, therefore, that the ratio of H:ID should be less than 4:1 in order to provide maximum activity for the steam hydrocarbon reaction.

The marked difference in activity between catalyst 2 and catalyst 3 was clearly unexpected. According to the predictions from the data derived from the teachings of Campbell, Huntington and Leva, the $ACF^R$ of catalyst 2 would be within the same general range as the $ACF^R$ of catalyst 3 and the ACF$^R$/PF$^R$ for catalyst 2 and for catalyst 3 would be in the same range (5.28 1 and 4.88).

It was found, however, that catalyst 3 rather than being less active than catalyst 2 was more active in that the methane leakage at 14,000 degrees, was almost a third of that obtained with catalyst 2. Further, the methane leakage at 16,000 for catalyst 3 was about one-tenth of the methane leakage obtained with catalyst 2. This was true even though the two catalysts had the same concentration of nickel, the same type of carrier and the same general geometric configuration. The only difference was the height of the tablet of catalyst 3 as compared to catalyst 2. However, it was noted that the ratio of height to effective internal diameter of catalyst 3 was within the claimed range whereas the ratio of height of effective diameter of the opening of catalyst 2 was much outside of the range.

Because of this unexpected finding, a theoretical explanation was sought to explain these seeming discrepancies. The explanation involved certain assumptions. One of these assumptions involved the comparsion of gas molecules with rays of light. The purpose of the explanation was to determine the effectiveness of the inner surface of the holes i.e. the surface areas provided by the inner walls of the gas passages 9 as contrasted with the effectiveness of the exterior surface encountered with solid cylinders, spheres and the like. Following this analogy, it was assumed that the interior surface of the holes would be less bright than the exterior surface of the cylinder, i.e. that the middle of the tunnel, would be darker than would be the area surrounding the tunnel entrance. This lack of brightness was thought to be proportional to the length of the tunnel (height of the tablet). Further, since the reaction was endothermic and since heat must be supplied to the reactor by externally fired burners it was hypothesized that not only was the tunnel darker in the middle but that due to the heat absorbing reaction in the middle of the tunnel, shielded by the ceramic catalyst wall from the external source of heat, that it was also cooler in the darker portion of the tunnel. The postulate was, then, that catalytic activity and heat transfer of the interior surface of the walls of the gas channels were inversely proportional to the height of the tablet (length of the tunnel) and directly proportional to the diameter of the hole (width of the tunnel) and that therefore there was a relationship between the effectiveness of the catalyst pellet and the ratio of pellet height versus effective hole diameter.

A method was designed to demonstrate this involving two parallel lines drawn to simulate the walls of the gas channel. Section VI. The sum of the two angles which could strike each point over the length of these lines was integrated as is shown in FIG. VI.

Now integrating $\Sigma(\theta 1 + \eta 2)$ dx from x=0 to x=1
Where
RA=H/HOL (ratio of Height to Diameter of the Hole)
d=the derivative of the length
x=the length It was found that as RA approaches 0, $\Sigma$ approaches 2 pi. The symbol F1, as used herein, indicates the effectiveness of the catalytic surface both for catalytic activity and for heat transfer.

Therefore, $F1 = 0.63662 \times ATAN [1/(RA-2.5)] + 0.31831/RA - 2.5 \times ALOG [1 + (RA-2.5)^2]$.

Where 0.63662 is a constant derived from the integration.

Where 0.31831 is a constant derived from the integration.

Where 2.5 = the ratio of H:D of a ⅜×⅜×¼" ring. This factor of 2.5 takes into consideration the turbulent whirlpool effect of gas molecules at the entrance of the hole opening (as contrasted with the straight line path of light rays) and is in agreement with commercial experience to the effect that ⅜×⅜×¼" rings exhibit an activity indicating that both the interior and exterior surfaces of the rings of this dimension are fully effective. Therefore, since the inner walls of the ⅜" ring having ¼" diameter opening are apparently fully effective, this value was subtracted from the RA factor for the computation. When the various RA factors are from 1-10, that is (height to effective hole diameter ratios of 1:1 to 10:1) the following F1 (catalytic effectiveness) values are obtained.

TABLE IV

| RA | F1 |
|---|---|
| 10 | .256 |
| 5 | .494 |
| 4 | .624 |
| 3 | .847 |
| 2 | 1.000 |
| 1 | 1.000 |

It is clear then from the theoretical values that a height to effective hole diameter ratio of 4.1 is equivalent to a +60% catalytic effectiveness. This value increases up to 100% as the ratio is lowered. Conversely at values for H:ID ratios greater than 4 the catalytic effectiveness decreases from around 50% down to around 25%. It will be remembered that from experimental data presented in Table III indicated at 1400° F., a methane leakage for catalyst 3 of about ⅓ that of catalyst 4. Looking at the predicted values in Table IV in comparison with the H:ID ratios for catalyst 3 and catalyst 2 in Table III, it can be seen that the predicted values presented here are in general agreement with the experimental data previously presented in Table III.

Figure 7:
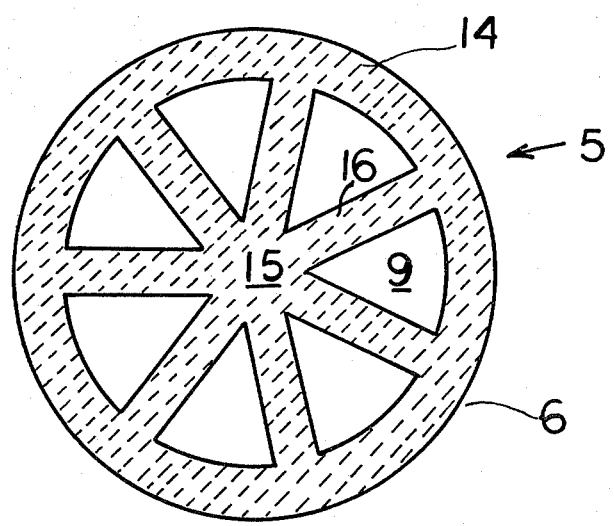
FIG. 7 is an end view of a catalyst tablet in the form of a spoked wheel drawn to a scale of 5:1 and having a peripheral rim and central hub with seven radially projecting spokes which define pie-shaped gas passages extending axially through the tablet.

To further demonstrate this effect, two different catalysts were tested. Each of these catalysts were tested identically to the previous catalyst. The first catalyst, as illustrated in FIG. 7 consisted of an alpha alumina carrier in the form of a spoked wheel 6 having a peripheral rim 14, a centrally located hub 15 and seven radially projecting spokes 16. The nickel constituent was added by sequentially dipping the carrier into a nickel nitrate solution followed by sequential calcinations until a concentration of 12% nickel, expressed as the metal, was obtained. The finished catalyst was then divided into segments. One was 0.648" in height and the other 0.293" in height. Other than this, the catalysts were identical. The activity, of each of these catalysts is shown in Table V.

TABLE V

| FIG. | Carrier Composition | Percent Nickel | Diameter Inches | Inner Dimension | Spoke Thickness | Height Inches H |
|---|---|---|---|---|---|---|
| 7 | | | | | | |
| 7 spoke | Alpha alumina Alpha | 12% | .648 | .498 | .060 | .648 |

TABLE V-continued

| Wheel | alumina | 12% | .648 | .498 | .060 | .293 |
|---|---|---|---|---|---|---|

| Equivalent Hole Diameter ID | Ratio H:ID | Predicted Activity | Experimental Activity | Methane Leakage |
|---|---|---|---|---|
| .1372 | 4.72 | 100 | 100 | .339 |
| .1372 | 2.14 | 159 | 168 | .03 |

The equivalent hole diameter, ID of each of the pie shaped gas passages 9, expressed as a circle, were 0.1372" and were identical for both samples. The only difference therefore was in the height or length of the tablet and the ratio of H:ID. The longer of the samples had a ratio of H:ID of 4.72:1 whereas the shorter of the samples was within the claimed range of 2.4:1. The experimental activity for the longer of the samples was expressed as 100 and the predicted increase in activity of the shorter sample was calculated and was found to be 159. It will be noted that the experimental activity of 168 agrees closely with the predicted value of 159.

Figure 8:
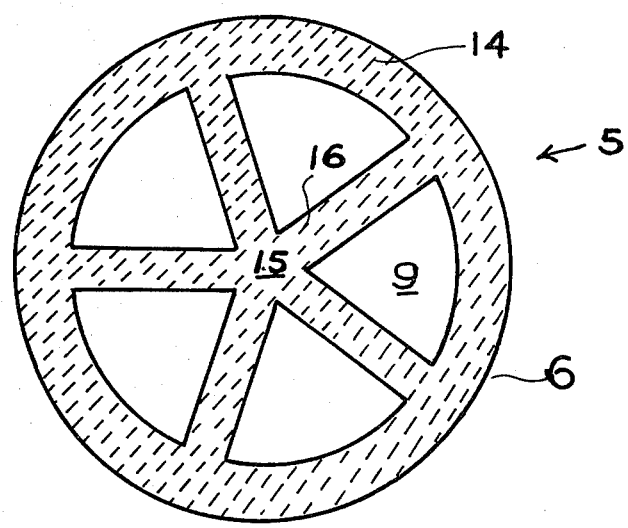
FIG. 8 is an end view of a catalyst pellet in the form of a spoked wheel, drawn to a scale of 5:1 and having a peripheral rim, a central hub with five radially projecting spokes which define pie-shaped gas passages extending axially through the pellet.

The second sample FIG. 8 was of the same general geometric configuration however with five radiating spokes 16 rather than seven radiating spokes. This catalyst was prepared in a different manner, and was intrinsically less active than the seven spoked wheel. Nevertheless, again taking the longer sample's measured activity as 100 and predicting from this the expected increase in activity of the smaller sample, close agreement was obtained with a predicted activity 131 which agrees well with the actual experimental activity of 136. See Table VI.

TABLE VI

| FIG. 8 | Carrier Composition | Percent Nickel | Diameter Inches | Inner Diameter | Spoke Thickness | Height Inches H |
|---|---|---|---|---|---|---|
| 5 spoke | Alpha alumina | 12% | .6693 | .5118 | .0551 | .6693 |
| Wheel | Alpha alumina | 12% | .6693 | .5118 | .0551 | .2933 |

| Equivalent Hole Diameter ID | Ratio H:ID | Predicted Activity | Experimental Activity | Methane Leakage |
|---|---|---|---|---|
| .1892 | 3.54 | 100 | 100 | .783 |
| .1892 | 1.55 | 131 | 136 | .239 |

It should be pointed out that with all of these catalysts, the geometric configurations were identical except for the length or the height of the tablets and the corresponding differences in Height to ID(H:ID) ratios. The theoretical explanations and predictions based thereon were in close agreement with measured experimental data, both with the honeycomb type of structures and with the spoked wheel type structures. Thus, it can be said that the particular geometric structure in itself is not critical so long as consideration is given to the H:ID ratio of the multi-hole tablets.

Many modifications will occur to those skilled in the art from the detailed description hereinabove given and such description is meant to be illustrative in nature and non-limiting except so as to be commensurate in scope with the appended claims.

We claim:

1. A hydrocarbon reforming catalyst comprising a cylindrical refractory support consisting essentially of alumina in the alpha phase, said support having a surface area of not more than 15 square meters per gram and having two or more gas passages extending axially therethrough from one end to the other and a catalytically active amount of nickel or cobalt oxide deposited there upon in a concentration of from 6 to 30% by weight expressed as the metal, said catalyst having a Relative Activity Coefficient Factor ($ACF^R$) and a Relative Pressure Factor ($PF^R$) in excess of that when compared to a standard ring, said ($ACF^R$) being in excess of 1 and the ratio of said ($ACF^R$) to said ($PF^R$) being in excess of 1:1, the height (H) of said support bearing a relationship to the effective internal diameter of each of said gas passages (ID), the ratio of H:ID being less than 4:1.

2. A hydrocarbon reforming catalyst, as defined in claim 1, in which said cylindrical refractory support is in the form of a spoked wheel, having a peripheral rim, a centrally located hub, and a plurality of radially extending spokes, defining pie-shaped gas passages.

* * * * *

UNITED STATES PATENT OFFICE
CERTIFICATE OF CORRECTION

Patent No. 4,233,187　　　　　　　　　Dated November 11, 1980

Inventor(s) Kenton Atwood and James H. Wright

It is certified that error appears in the above-identified patent and that said Letters Patent are hereby corrected as shown below:

```
Title Page [75]   Inventors   Delete "Jay S. Merriam, La Grange,
                                     both of"
Col. 1, line 61   change "crystaline" to -crystalline-
Col. 2, line 39   add a comma after "passages"
Col. 3, line 64   add a comma before "as" and after "known"
Col. 4, line 26   change the period to a semi-colon
Col. 4, line 37   insert -a- before "circle"
Col. 5, line 56   change "in" to -is-
Col. 7, Table II  Under Catalyst 2, at Chemicals (XRF)", change
                  "01% Zn" to -0.01% Zn-
Col. 7, line 37   change "hydrocarbon" to -hydrogen-
Col. 9, line 2    after "5.28" delete "1"
Col. 9, line 5    change "14,000" to -1400 F-
Col. 9, line 7    change "16,000" to -1600 F-
Col. 9, line 53   change "Section" to -FIG-
Col. 9, line 56   change "η" to -θ-
Col. 10, line 64  change "Dimention" to --Dimension--.
Col. 11, line 16  change "2.4" to -2.14-
```

Signed and Sealed this

Sixth Day of April 1982

|SEAL|

Attest:

GERALD J. MOSSINGHOFF

Attesting Officer　　Commissioner of Patents and Trademarks

UNITED STATES PATENT OFFICE
CERTIFICATE OF CORRECTION Page 1 of 4

Patent No. 4,233,187           Dated November 11, 1980

Inventor(s) Kenton Atwood and James H. Wright

It is certified that error appears in the above-identified patent and that said Letters Patent are hereby corrected as shown below:

| | |
|---|---|
| Col. 1, line 39 | delete the comma after "reformer" |
| Col. 2, line 10 | add a comma after "accepted" |
| Col. 2, line 14 | delete the comma after "reaction" |
| Col. 2, line 21 | add a comma before and after "however" |
| Col. 2, line 63 | delete the comma after "we" |
| Col. 3, line 51 | delete the terminal s of "communicates" |
| Col. 3, line 64 | add a comma before "as" |
| Col. 3, line 64 | add a comma after "known" |
| Col. 3, line 64 | delete the terminal s of "consists" |
| Col. 3, line 66 | correct the spelling of "difficultly" |
| Col. 4, line 1 | add a comma after "aluminum" |
| Col. 4, line 2 | place a comma after "cobalt" |
| Col. 4, line 22 | add an s to "contribute" |
| Col. 4, line 45 | add a comma after "equations" |
| Col. 4, line 67 | correct the spelling of "particles" |
| Col. 4, line 68 | add a terminal s to "particle" |
| Col. 5, line 21 | delete "standard" and add --sample-- |
| Col. 5, line 22 | delete "sample" and add --standard-- therefor |
| Col. 5, line 29 | delete the comma after "4" and substitute therefor --and-- |
| Col. 5, line 29 | delete the comma after "5" |
| Col. 5, line 29 | delete "6 and 7" |

Table I should appear as follows:

TABLE I

| | \multicolumn{7}{c}{(Based on a 2.9 inch ID tube)} | | | | | | |
|---|---|---|---|---|---|---|---|

| | $ACF^R$ | $PF^R$ | RATIO $\frac{ACF^R}{PF^R}$ | Diameter (in.) | Height (in.) | ID (in.) | Equiv. No. of Holes |
|---|---|---|---|---|---|---|---|
| Standard | 1 | 1 | 1 | .625 | .375 | .25 | 1 |
| Honeycomb FIG. 4 | 2.48 | .94 | 2.63 | .785 | .797 | .076 | 46 |
| Honeycomb FIG. 5 | 2.16 | .70 | 3.09 | .625 | .250 | .135 | 11 |

UNITED STATES PATENT OFFICE
CERTIFICATE OF CORRECTION

Page 2 of 4

Patent No. 4,233,187     Dated November 11, 1980

Inventor(s) Kenton Atwood and James H. Wright

It is certified that error appears in the above-identified patent and that said Letters Patent are hereby corrected as shown below:

Col. 6, line 14    delete the comma after "ratio"
Col. 6, line 30    delete "1/2" and insert therefor --3/8--
Col. 6, line 30    delete "3/8" and insert therefor --1/4--
Col. 6, line 49    delete "were" and substitute --was--
Col. 6, TABLE II, under Catalyst 3, add --Composition-- directly beneath "Corundum" and directly above "$Al_2O_3$". Delete "Quantity".
Col. 6, TABLE II, under Catalyst 2, delete "FIG. 4"
Col. 7, TABLE II, under "XRD" omit "350"
Col. 7, TABLE II, under Catalyst 1, omit "(400 Å)"
Col. 7, TABLE II, omit entire line starting with "Hg. Pore Vol." and ending "350 Å -0.218".
Col. 7, TABLE II, last line insert --Hg. Pore Vol.-- before "(cc/g.."
Col. 7, TABLE II, last line insert -->-- before "350 Å)".
Col. 7, TABLE III should appear as follows:

TABLE III

| Carrier Size (Inches) Nickel Content H:ID | Catalyst 1 Cordierite Honeycomb .799 x .797 12% Ni 9.06:1 | Catalyst 2 Corundum Honeycomb .785 x .797 12% Ni 9.29:1 | Catalyst 3 Corundum Honeycomb .8055 x .2598 12% Ni 2.95:1 | Catalyst 4 Corundum Ring 5/8" x 3/8" x 1/4" 12% Ni 1.5:1 |
|---|---|---|---|---|
| $CH_4$ Leakage* | | | | |
| 1400° | 2.74 | 0.74 | 0.245 | .75 |
| 1600° | 0.49 | 0.19 | 0.017 | .2 |
| $ACF^R$ | 2.45 | 2.48 | 2.74 | 1.00 |
| $ACF^R/PF^R$ | 2.68 | 2.63 | 2.47 | 1.00 |

UNITED STATES PATENT OFFICE
CERTIFICATE OF CORRECTION

Patent No. 4,233,187        Dated November 11, 1980

Inventor(s) Kenton Atwood and James H. Wright

It is certified that error appears in the above-identified patent and that said Letters Patent are hereby corrected as shown below:

| | |
|---|---|
| Col. 7, line 68 | insert a comma after "catalyst" |
| Col. 8, line 34 | insert a comma after "Note" |
| Col. 8, line 41 | delete ";" and substitute therefor --,-- |
| Col. 8, line 42 | change the "h" to --H-- |
| Col. 8, line 53 | insert a comma before and after "then" |
| Col. 9, line 2 | delete "5.28 and 4.88" and substitue therefor --2.63 and 2.47-- |
| Col. 9, line 3 | insert a comma after "3" |
| Col. 9, line 4 | insert a comma after "2" |
| Col. 9, line 5 | delete the comma after "degrees" |
| Col. 9, line 15 | insert a comma after "range" |
| Col. 9, line 15 | delete "of" and substitute --to-- |
| Col. 9, line 21 | correct the spelling of "comparison" |
| Col. 9, line 24 | insert a comma before and after "i.e." |
| Col. 9, line 30 | insert a comma after "i.e." |
| Col. 9, line 30 | delete the comma after "tunnel" |
| Col. 9, line 34 | insert a comma after "endothermic" |
| Col. 9, line 36 | add a comma after "burners" |
| Col. 9, line 36 | add a comma after "that" |
| Col. 9, line 37 | add a comma after "middle" |
| Col. 9, line 37 | add a comma after "that" |
| Col. 9, line 41 | delete "that" before "it" |
| Col. 10, line 2 | put parenthesis around "RA-2.5", second occurrence |
| Col. 10, line 19 | delete "that is" and insert therefor --i.e.-- |
| Col. 10, line 33 | add a comma before and after "then" |
| Col. 10, line 33 | add a comma after "values" |
| Col. 10, line 34 | change "4.1" to --4:1-- |
| Col. 10, line 36 | add a comma after "Conversely" |
| Col. 10, line 37 | add a comma after "4" |
| Col. 10, line 40 | insert a comma after "III" |
| Col. 10, line 41 | insert --is seen-- after "4" |
| Col. 10, line 50 | add a comma after "7" |
| Col. 10, line 60 | delete the comma after "activity" |

UNITED STATES PATENT OFFICE
CERTIFICATE OF CORRECTION

Page 4 of 4

Patent No. 4,233,187  Dated November 11, 1980

Inventor(s) Kenton Atwood and James H. Wright

It is certified that error appears in the above-identified patent and that said Letters Patent are hereby corrected as shown below:

| | |
|---|---|
| Col. 11, line 10 | delete the comma after "diameter" |
| Col. 11, line 11 | delete "were" and substitute therefor --was-- |
| Col. 11, line 12 | delete "were" and substitute therefor --was-- |
| Col. 11, line 13 | place a comma before and after "therefore" |
| Col. 11, line 15 | place a comma after "4.72:1" |
| Col. 11, line 23 | place a comma before and after "FIG. 8" |
| Col. 11, line 24 | place a comma before and after "however" |
| Claim 1, line 8 | delete "there upon" and substitute therefor --thereon-- |

Signed and Sealed this

First Day of November 1983

[SEAL]

Attest:

GERALD J. MOSSINGHOFF

Attesting Officer

Commissioner of Patents and Trademarks